United States Patent [19]

Augustin

[11] Patent Number: 5,542,610
[45] Date of Patent: Aug. 6, 1996

[54] FUEL INJECTION NOZZLE WITH INTEGRAL SOLENOID VALVE

[75] Inventor: Ulrich Augustin, Kernen, Germany

[73] Assignee: Mercedes-Benz AG, Stuttgart, Germany

[21] Appl. No.: 325,063

[22] Filed: Oct. 19, 1994

[30] Foreign Application Priority Data

Oct. 22, 1993 [DE] Germany .................. 43 36 108.0

[51] Int. Cl.[6] .................................................. F02M 51/02
[52] U.S. Cl. .................... 239/533.8; 239/585.1; 239/600
[58] Field of Search ................... 239/533.8, 585.1, 239/585.5, 533.9, 600, 124, 127; 251/129.16

[56] References Cited

U.S. PATENT DOCUMENTS

| | | | |
|---|---|---|---|
| 3,640,466 | 2/1972 | Steiger | 239/533.8 X |
| 3,997,117 | 12/1976 | Kohler et al. | 239/533.8 |
| 4,460,015 | 7/1984 | Burl et al. | |
| 4,899,935 | 2/1990 | Yoshida et al. | 239/533.2 X |
| 5,263,695 | 11/1993 | Paul et al. | 239/533.8 X |

FOREIGN PATENT DOCUMENTS

| | | | |
|---|---|---|---|
| 0367114 | 5/1990 | European Pat. Off. | |
| 0484804 | 5/1992 | European Pat. Off. | |
| 4115477 | 11/1991 | Germany | 239/533.8 |
| 556140 | 9/1943 | United Kingdom | 239/533.8 |

*Primary Examiner*—Kevin P. Weldon
*Attorney, Agent, or Firm*—Klaus J. Bach

[57] ABSTRACT

A fuel injection nozzle with integral solenoid valve for internal combustion engines, with an injection nozzle body having a nozzle needle movably disposed therein and being spring-biased to a normally closed position comprises a multipart solenoid valve housing including a first housing part receiving an annular magnetic coil and a second housing part disposed between the first housing part and the fuel nozzle body and having a disc-shaped magnetic armature mounted on an armature shaft movably supported therein, wherein the armature shaft is slightly shorter than the second housing part and has valve seating surfaces at its opposite ends for closing, in its upper end position, an opening of a pressurized fuel passage in the first housing part and, in its lower end position, an opening of a pressure relief channel in the nozzle body, the openings being formed in the planar faces of the first housing part and the nozzle body between which the second housing part, which includes the armature shaft, is sandwiched.

4 Claims, 1 Drawing Sheet

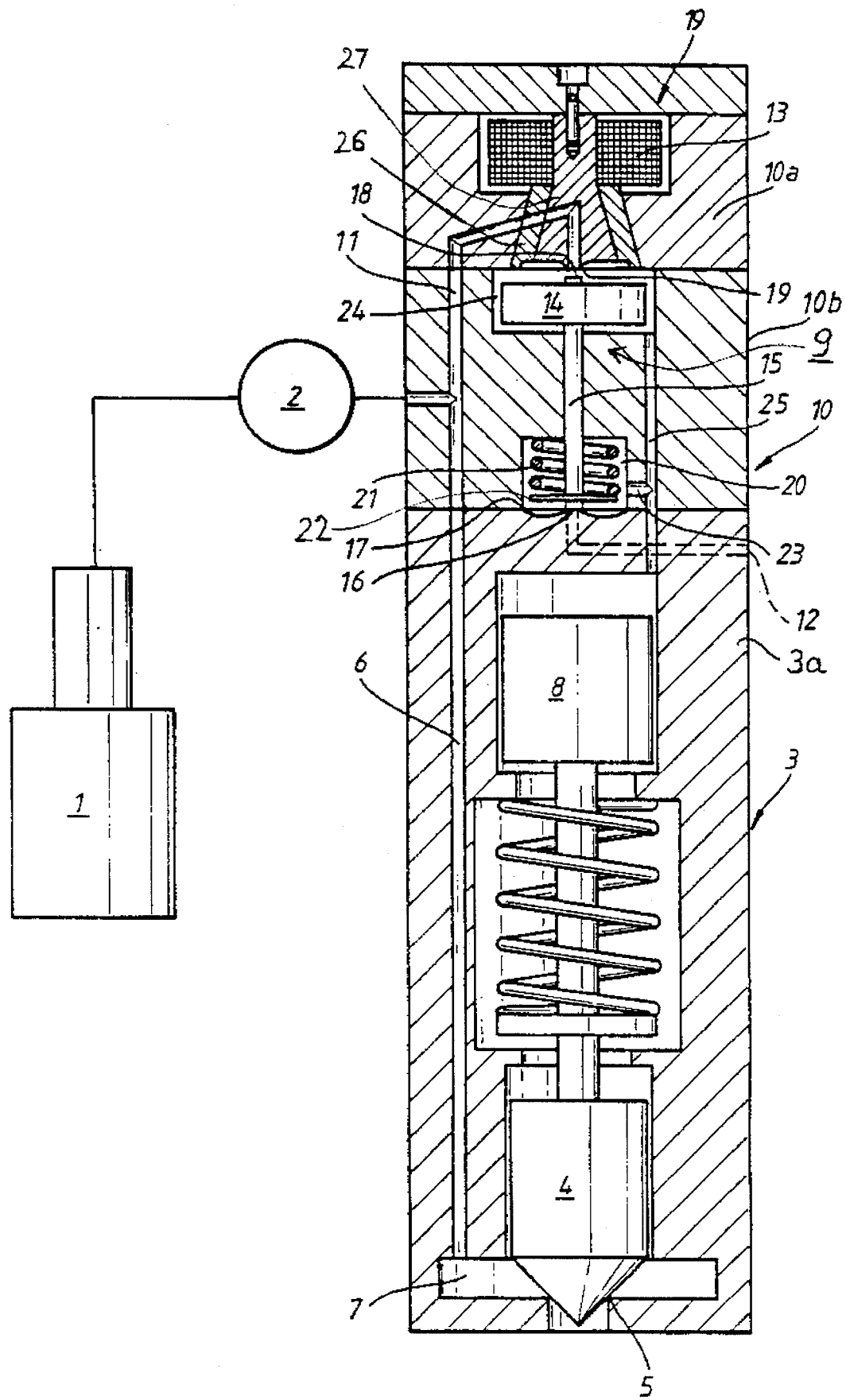

FUEL INJECTION NOZZLE WITH INTEGRAL SOLENOID VALVE

BACKGROUND OF THE INVENTION

The invention relates to a fuel injection nozzle with an integral solenoid valve for an internal-combustion engine.

EP 0 367 114 A2 discloses a solenoid valve for a fuel injection nozzle which is composed on the one hand of an annular magnet stator and on the other hand of a disc-shaped magnet armature with a hollow magnet armature shaft provided with a bore arrangement by means of which the rear of the nozzle can be connected to a high-pressure connection or a low-pressure connection depending on the position of the magnet armature shaft. The solenoid valve has two bevel seats which determine the travel length of the magnet armature shaft.

The object of the present invention is to provide such a solenoid valve which has a low mass and which can be built cost-effectively and which has furthermore, a precisely defined valve travel length.

SUMMARY OF THE INVENTION

In a fuel injection nozzle with integral solenoid valve for internal-combustion engines, which comprises an injection nozzle body having a pressure space with a fuel injection nozzle opening and a nozzle needle movably disposed in said nozzle body and being spring-biased so as to normally close said fuel injection nozzle opening with one axial end thereof, said solenoid valve is disposed in a multi-part solenoid valve housing including a first housing part receiving an annular magnetic coil and a second housing part disposed between the first housing part and the fuel nozzle body and having a disc-shaped magnetic armature mounted on an armature shaft movably supported therein wherein the armature shaft is slightly shorter than the second housing part and has valve seating surfaces at its opposite ends and the upper housing part includes a pressurized fuel passage with a planar seal seat formed in axial alignment with the armature shaft on the flat lower surface of the first housing part and the nozzle body has a pressure relief channel with an opening and seal seat also arranged in axial alignment with the armature shaft which is spring-biased so as to be normally seated on the fuel injection nozzle body for closing the pressure relief channel while the pressurized fuel passage in the upper housing part is open for supplying pressurized fuel through a passage section extending through the second housing part to the other axial end of the injection nozzle and the armature shaft, when moved by energization of the coil to close the high-pressure fuel passage, opens the pressure relief channel so as to provide communication between the passage section in the second housing part and the pressure relief channel thereby causing a collapse of the pressure on the other end of the fuel injection needle permitting lift off of the injection nozzle needle by the fuel under pressure in the pressure space.

With the arrangement according to the invention a three-way function valve structure is obtained which is low in mass and inexpensive to manufacture and in which the high-pressure connection can be controlled solely by the disc-shaped magnet armature without the need for a bore arrangement in the magnet armature shaft. The magnet armature shaft is thin and therefore has a low mass and it also assumes guiding properties providing for accurate and properly operating valve seating. As a result of the double flat seat arrangement, the valve travel length is predetermined precisely so that the opening and closing of the fuel injection nozzle is accurately controlled and thus, the amount of fuel is accurately determined whereby, ultimately the same amount of fuel is injected by the various fuel injection nozzles by the same electronic actuation input to the different fuel injection nozzles of a multi-cylinder internal-combustion engine.

BRIEF DESCRIPTION OF THE DRAWING

In the sole figure the valve according to the invention is illustrated in a cross-sectional view.

DESCRIPTION OF A PREFERRED EMBODIMENT

A cam-activated high-pressure pump 1 feeds fuel into a common supply line 2 (common rail), which acts as high-pressure accumulator, for all the solenoid valve-controlled fuel injection nozzles 3 of a multi-cylinder internal-combustion engine.

Each injection nozzle 3 has a spring-loaded nozzle needle 4 which lifts off from its needle seat 5, counter to the direction of flow of the fuel, when the rear side of the nozzle needle is relieved of pressure.

A fuel supply passage 6 which is connected to the supply line 2 leads to a pressure space 7 which surrounds the nozzle needle 4. An auxiliary piston 8 may be provided which acts on the nozzle needle 4, which auxiliary piston 8 can be connected by means of a solenoid valve 9, located coaxially with respect to the nozzle needle 4 and to the auxiliary piston 8 in the valve housing 10 either, to a high-pressure passage 11 which branches off from the fuel supply passage 6 or to a pressure relief channel 12.

The solenoid valve 9 is designed as a double-acting ⅔-way flat seat valve and comprises an annular magnet coil 13 in the upper housing part 10a of the valve housing 10 and of a disc-shaped magnet armature 14 with a magnet armature shaft 15 disposed in the lower housing part 10b, which shaft is quite thin and therefore has relatively little mass.

The free end at the magnet armature shaft 15 forms a planar sealing seating face 16 which rests sealingly on a flat seat 17 adjacent the pressure relief channel 12 and is formed by the surface-ground bearing race of the nozzle body 3a on which the lower housing part 10b rests. The other end of the magnet armature shaft 15 is elongated to protrude through the magnet armature 14 and slightly projects from it and also forms a planar sealing seating face 18 which interacts with a high-pressure side flat seat 19 of the high-pressure passage 11 which is part of the surface-ground bearing face of the upper housing part 10a.

In a spring space 20 in the lower area of the lower housing part 10b, a return spring 21 is supported at one end on the housing part 10b and at the opposite end on a support ring 22 which is firmly connected to the magnet armature shaft 15, such that the return spring 21 causes the magnet armature shaft 15 to be seated on and close the pressure relief channel 12 when the solenoid valve is not energized. The spring space 20 is in communication by means of a connecting passage 23 with a high-pressure passage section 25 which extends from a space 24 receiving the magnet armature 14 to the cavity receiving the auxiliary piston 8.

Between the annular magnet coil 13 and the magnet armature 14 there is a sleeve-shaped spacing element 26 which is firmly mounted in the upper housing part 10a and consists of a non-magnetic material. The spacing element 26 surrounds a central element 27 through which part of the high-pressure passage 11 extends centrally to the flat seat 19.

OPERATION OF THE VALVE

Normally the spring-loaded nozzle valve needle 4 is seated on the needle seat 5 and the armature shaft 15 is seated on the seat 17 so that the passage of fuel supplied under pressure to the fuel feed line 6 is blocked. If the valve coil 13 is energized the armature 14 is moved upwardly and closes the solenoid valve 9 while opening the pressure relief passage 12 whereby the fuel pressure on one side of the piston 8 collapses so that the fuel pressure at the opposite side lifts the nozzle needle 4 permitting discharge of pressurized fuel past the needle seat 5 and needle 4. Upon deenergization of the valve coil 13 the relief passage 12 is again blocked and solenoid valve 9 is opened so that pressure is again established in line section 25 and at the one side of piston 8 whereby the valve needle 4 is again seated and discharge of fuel is interrupted.

What is claimed is:

1. A fuel injection nozzle with integral solenoid valve for internal-combustion engines, comprising an injection nozzle body having a pressure space with a fuel injection nozzle opening and a nozzle needle movably disposed in said nozzle body and being spring-biased so as to normally close said fuel injection nozzle opening with one axial end thereof, and a multi-part solenoid valve housing including a first housing part receiving an annular magnetic coil and a second housing part disposed between said first housing part and said fuel nozzle body and having disposed therein a disc-shaped magnetic armature with an armature shaft movably supported so as to guide said magnetic armature, said armature shaft having seating faces formed at its opposite axial ends, said nozzle body and said first and second housing parts having planar end faces in engagement with one another, and said upper housing part including a pressurized fuel supply passage in communication with a fuel supply passage extending to said pressure space and having a passage opening with a seal seat disposed in said planar surface in axial alignment with said armature shaft and said nozzle body having a pressure relief channel with an opening with a seal seat arranged in the planar surface of said nozzle body and also in axial alignment with said armature shaft, said armature shaft being spring-biased to one end position so as to be normally seated on said fuel injection nozzle body for closing said pressure relief channel while the pressurized fuel passage in said upper housing part is open for supplying pressurized fuel through a passage section extending through said second housing part to the back-side of said injection nozzle, and said armature shaft being movable by energization of said coil to its opposite end position for closing said high-pressure fuel supply passage in said upper housing part and opening said pressure relief channel so as to provide for communication between said passage section in said second housing part and said pressure relief channel thereby causing a collapse of the pressure at the other axial end of said fuel injection nozzle needle permitting the opening of said nozzle needle by the fuel under pressure in said pressure space for discharging fuel from said pressure space through said nozzle opening.

2. A fuel injection nozzle according to claim 1, wherein said seal seat on said first housing part is formed by surface-grinding the end face of the first housing part which includes the magnet coil, and the seal seat on said nozzle body is formed by surface-grinding the end face of said nozzle body adjacent to the second housing part.

3. A fuel injection nozzle according to claim 1, wherein a return spring is disposed around said magnet armature shaft and arranged in a spring space formed in the second housing part adjacent the planar end face of said nozzle body, said spring space being in communication with said high-pressure passage section by a connecting passage.

4. A fuel injection nozzle according to claim 1, wherein a spacing element consisting of antimagnetic material is disposed in the first valve housing part between said magnet armature and said annular magnet coil.

\* \* \* \* \*